United States Patent [19]
Kfoury et al.

[11] Patent Number: 6,049,192
[45] Date of Patent: Apr. 11, 2000

[54] BATTERY CHARGER HAVING MOVING DOOR HOUSING FOR A BATTERY

[75] Inventors: Tony N. Kfoury, Lisle; Jon Godston, Chicago; Robert Hertlein, Round Lake Beach; Andrew A. Powell, Chicago, all of Ill.

[73] Assignee: Motorola, Inc., Schaumburg, Ill.

[21] Appl. No.: 09/271,831

[22] Filed: Mar. 18, 1999

[51] Int. Cl.[7] .................................................. H01M 10/46
[52] U.S. Cl. .......................................... 320/113; 320/115
[58] Field of Search ..................................... 320/107, 110, 320/112, 113, 114, 115; D13/103, 107, 108; 429/99, 100

[56] References Cited

U.S. PATENT DOCUMENTS

| | | |
|---|---|---|
| D. 349,883 | 8/1994 | Gallagher et al. . |
| D. 353,131 | 12/1994 | Nagele . |
| 5,059,885 | 10/1991 | Weiss et al. . |
| 5,327,067 | 7/1994 | Scholder . |
| 5,347,208 | 9/1994 | Iida . |
| 5,525,888 | 6/1996 | Toya . |
| 5,656,914 | 8/1997 | Nagele et al. . |

OTHER PUBLICATIONS

NTT Do Co Mo, Mo Va, 94–4, Japan, pp. 1, 88, 90, year 1994.

*Primary Examiner*—Edward H. Tso
*Attorney, Agent, or Firm*—Michael C. Soldner; Randall S. Vaas

[57] ABSTRACT

A battery charger includes a main housing (103). A well (108) in the main housing is for receipt of an electronic device (102) including a battery. A door housing (104) is movably carried on the main housing. At least one contact (422) is carried on the main housing for connection to a battery (200, 300) inserted between the door housing and the main housing, wherein the door housing is movable between an open position for receipt of a battery and a compact closed position. A circuit is positioned in the main housing for electrical connection to the electronic device and the contacts for charging a battery.

20 Claims, 11 Drawing Sheets

BATTERY CHARGER HAVING MOVING DOOR HOUSING FOR A BATTERY

FIELD OF THE INVENTION

The present invention pertains generally to battery chargers and more particularly to battery chargers having a pocket for receiving batteries.

BACKGROUND OF THE INVENTION

Portable electronic devices are powered using a rechargeable battery. The rechargeable battery typically includes one or more electrochemical cells disposed within a housing. The housing includes a latching apparatus that allows the rechargeable battery to be detachably coupled to the portable electronic device. Contacts carried on the housing electrically connect the electrochemical cells to the portable electronic device.

To recharge the batteries, a communication device may include a charging circuit, which controls charging of the battery through the communication device when the communication device is connected to an external power supply. For example, the communication device may be connected to a vehicle electrical system through a cigarette lighter or to a conventional main power supply through a wall outlet. A transformer is employed to convert the wall outlet power supply to a standard DC voltage. Alternatively, the battery may be detached from the communication device and inserted into a charger that provides the necessary power regulation for charging the battery.

Conventionally, battery chargers have a pocket that receives and holds the rechargeable battery during charging. The charging pocket includes contacts positioned to mate with the contacts of the rechargeable battery. Alternatively, the charger can receive a battery in one pocket and phone having a battery thereon in another pocket. However, these chargers are relatively large. What is needed is a more versatile battery charger that can accommodate both connection of the communication device and the battery without requiring a large housing which is difficult to transport.

DETAILED DESCRIPTION OF THE DRAWINGS

A battery charger includes a main housing having a well for receipt of an electronic device including a battery. A door housing is movably carried on the main housing. At least one contact is carried on the main housing for connection to a battery inserted between the door housing and the main housing, wherein the door housing is movable between an open position for receipt of a battery and a compact closed position. A circuit is positioned in the main housing for electrical connection to the electronic device and the contacts for charging a battery.

Figure 1:
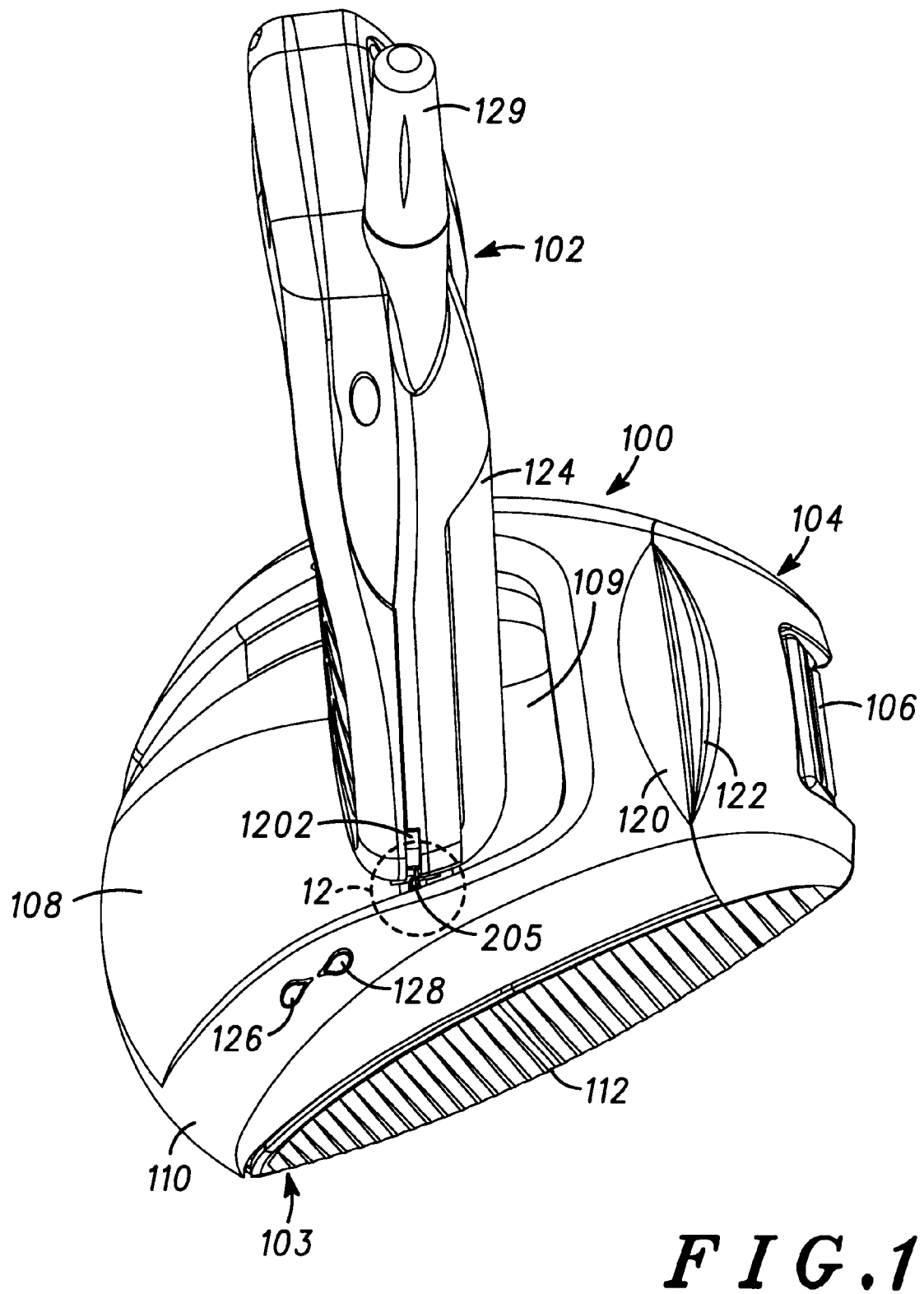
FIG. 1 is a top, back, right side perspective view illustrating a battery charger and associated portable battery powered electronic device.

A battery charger 100 for use with a portable battery-powered electronic device 102 is illustrated in FIG. 1. The electronic device 102 is a battery powered communication device, and may for example be a cellular radiotelephone, a satellite telephone, a cordless radiotelephone, a two-way radio, a pager, or any other portable device that requires battery power during portable operation. The communication device is illustrated with a thin battery mounted behind cover 124, but can optionally have a thick battery. If a thick battery is attached to the communication device, the rear portion 109 of the well 108 will be filled by the communication device and the thick battery inserted into the well.

The battery charger 100 includes a main housing 103 and a door housing 104. The main housing 103 includes a well 108 for receipt of the communication device 102 during charging or storage. The main housing 103 is comprised of an upper housing section 110 in which the well is positioned and a lower housing section 112. The door housing 104 is position to partially circumscribe a connector 106. The connector 106 is for connection to a cord, which in turn is connected to a main alternating current (AC) power supply of the type utilized with a common wall outlet. For example, the connector 106 can be connected via a cable to a 110 Volt AC power supply. The power supply may be any conventional power supply of the type commonly used throughout the world.

Thus the main housing preferably houses a power regulator which converts an external power supply to a standard DC voltage which is usable by the communication device 102 for charging a battery therein and also includes circuitry for generating a regulated voltage for charging a battery 200, 300 removed from the communication device. Indicators 126 and 128 are provided in the housing for identifying the charging status of a battery being charged whether the battery is in the device 102, behind cover 124, or connected in the pocket created by housing 104 being open.

Figure 2:
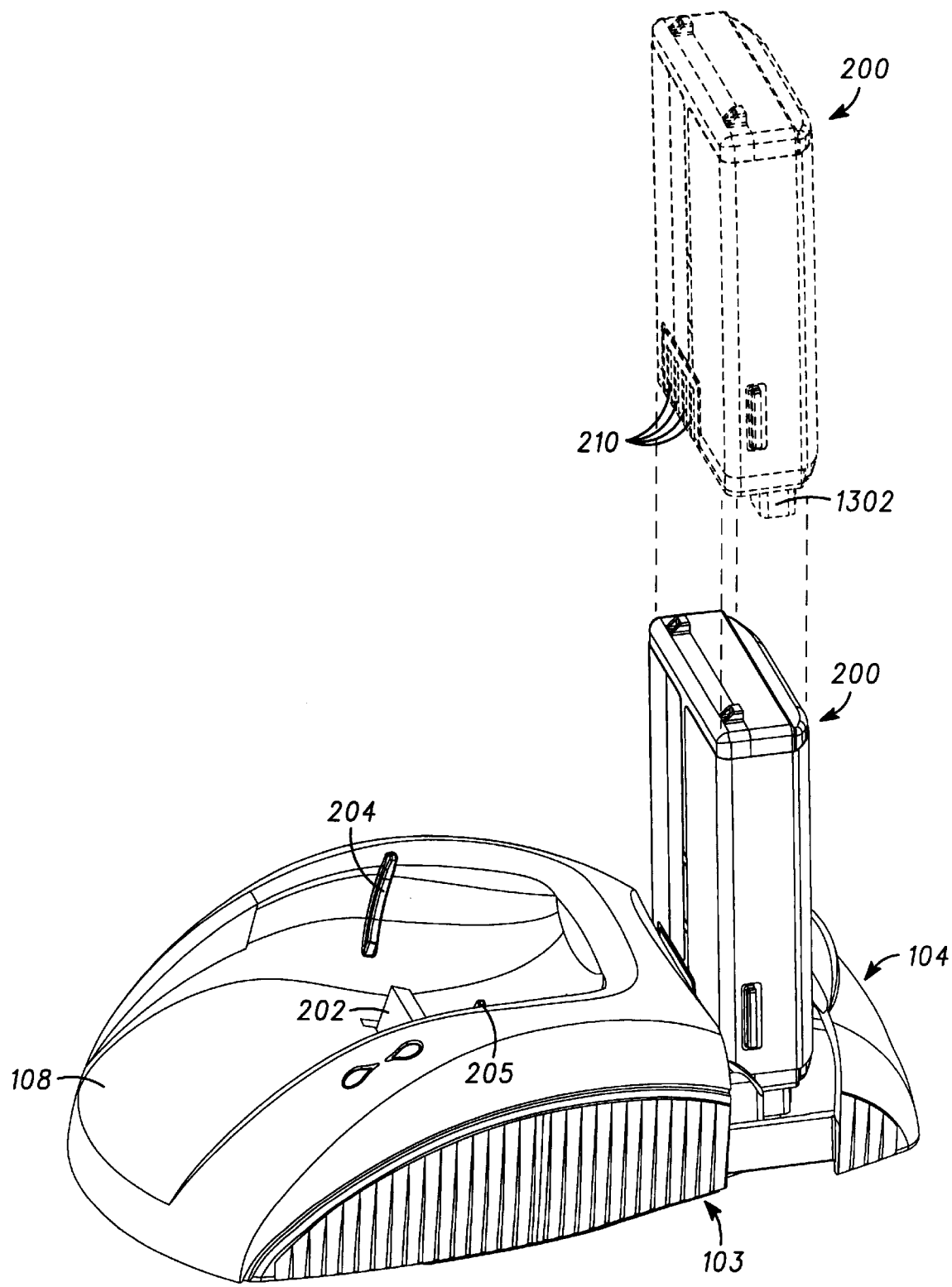
FIG. 2 is a top, front, right side perspective view illustrating a battery charger and associated battery usable therewith.
Figure 3:
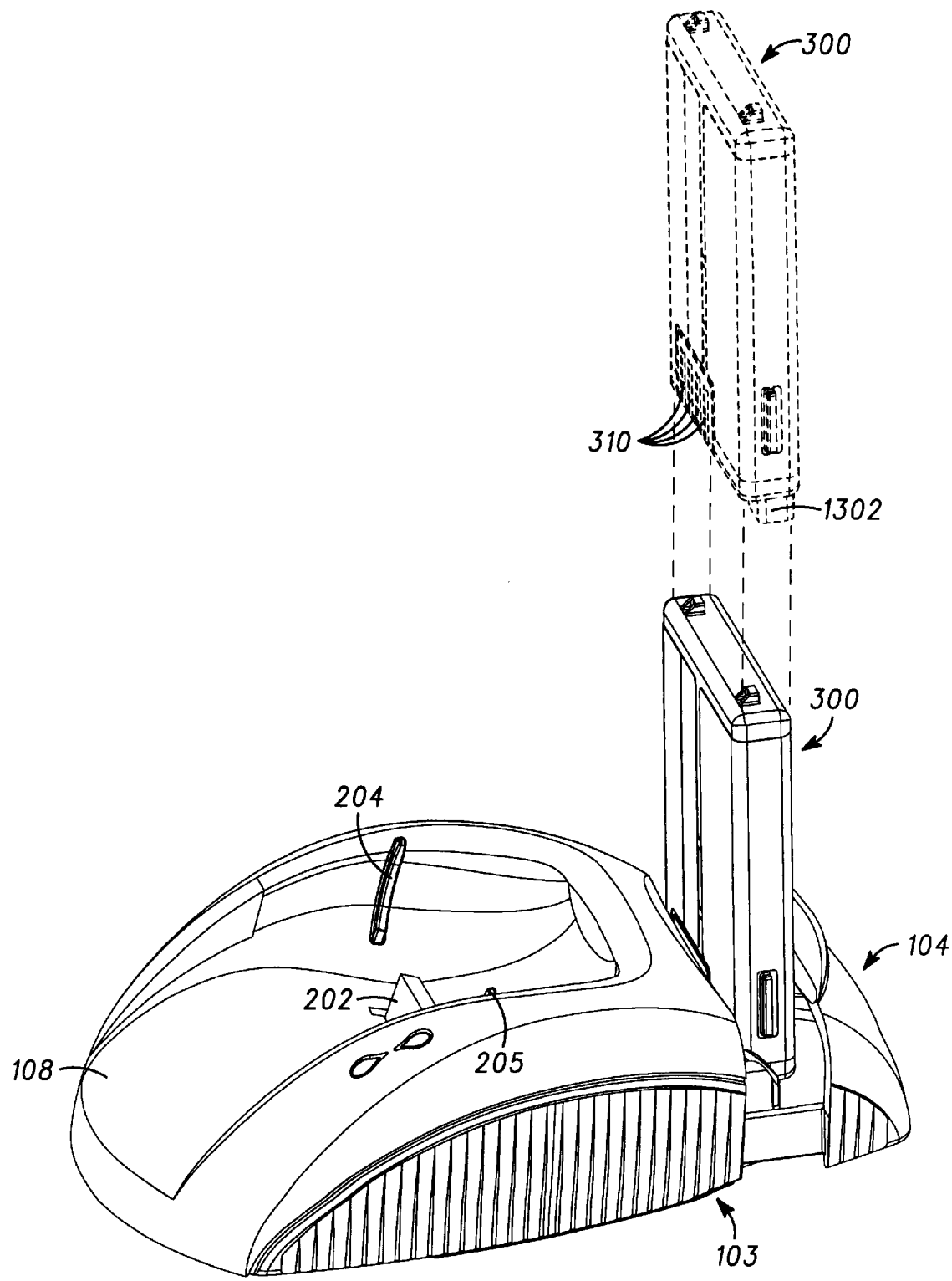
FIG. 3 is a top, front, and right side perspective view illustrating a battery charger and a different sized battery usable therewith.

To accommodate a battery 200 that has been removed from the communication device 102, battery charger 100 includes the door housing 104 moveably carried on main housing 103. The door housing 104 slides open to the position illustrated in FIG. 2 for receipt of a thick battery 200. The battery is electrically connected to the charger circuitry within main housing 103 when inserted. Alternatively, the battery 300 (FIG. 3), which has a smaller thickness than battery 200, can be inserted between the door housing 104 and the main housing 103. The thin battery 300 and the thick battery 200 have contacts 310 (FIG. 3) and 210 (FIG. 2) that are in the same position. Consequently, either battery will be connected to the internal circuitry when the battery is inserted between the door housing 104 and the main housing 103. As can be seen in FIGS. 2 and 3, the contacts 210, 310 are on the side of the batteries 200, 300, instead of the ends for easier connection to the electronic device 102.

The battery charger 103 will now be described in greater detail with reference to FIG. 4. The battery charger includes a top housing section 110, a printed circuit board assembly 404, and a lower housing section 112. The top housing section 110 includes device rails 204 and 205 for receipt in grooves 1202 (only one of which is shown in FIG. 1) on opposite sides of the communication device 102 housing. The device rails 204, 205 of communication device 102 align a connector (not shown, 1550 in FIG. 15) on the communication device with the connector 202, and hold the communication device 102 in an upright position.

An aperture 408 in well 108 is for receipt of the connector 202. Additionally, apertures 412 and 414 are provided in the upper housing section 110. The apertures 412 and 414 provide a passage to the terminal ends 126, 128 of light pipe 410 so that a visible indication of the battery charging status can be provided to the user.

The upper housing section 104 is preferably molded from an organic polymer, but can be manufactured from any suitable material.

A light pipe 410 and a contact block 420 are positioned between the printed circuit board assembly 404 and the top housing section 110. The light pipe 410 is of any suitable manufacture such as manufactured of a transparent material, and may for example be clear plastic that provides a channel for light to pass to opening 412 and 414.

The contact block 420 includes battery contacts 422 for connection to contacts 212 (FIG. 2) of battery 200 or contacts 310 (FIG. 3) of battery 300. The contact block also includes board contacts 424 (FIG. 4) for connection to surface contacts 426 on printed circuit board 405 of printed circuit board assembly 404. The contact block 420 comprises continuous conductors terminating in contacts 422 and 424. The conductors are positioned in a dielectric block, which may for example be a molded polymer block.

A connector 202 is mounted to printed circuit board 405. Circuit components 428, which are interconnected to form the charger circuit, are also mounted on the top surface of printed circuit board (PCB) 405. Light sources, such as light emitting diodes (not shown) are positioned behind recesses 416 and 418 into which light pipe 410 is inserted. The printed circuit board 405 also includes a large PCB aperture 434 and a small PCB aperture 436. The printed circuit board 405 may be of any suitable conventional manufacture.

The bottom housing section 112 includes a cylinder 446 having an opening 444 and a rim 451. The bottom housing section 112 is assembled by receiving the door housing 104, springs 440 and 442, feet 493–496, and label 498. The springs 440 and 442 provide bias to push the door housing 104 into the closed position for storage and transport. The feet 494–496 provide a non-scratching material for the base of the charger. The bottom housing section and the door housing can be manufactured of the same material as the upper housing section 110, or of a different material. They may be manufactured from an organic polymer or stamped metal.

Figure 5:
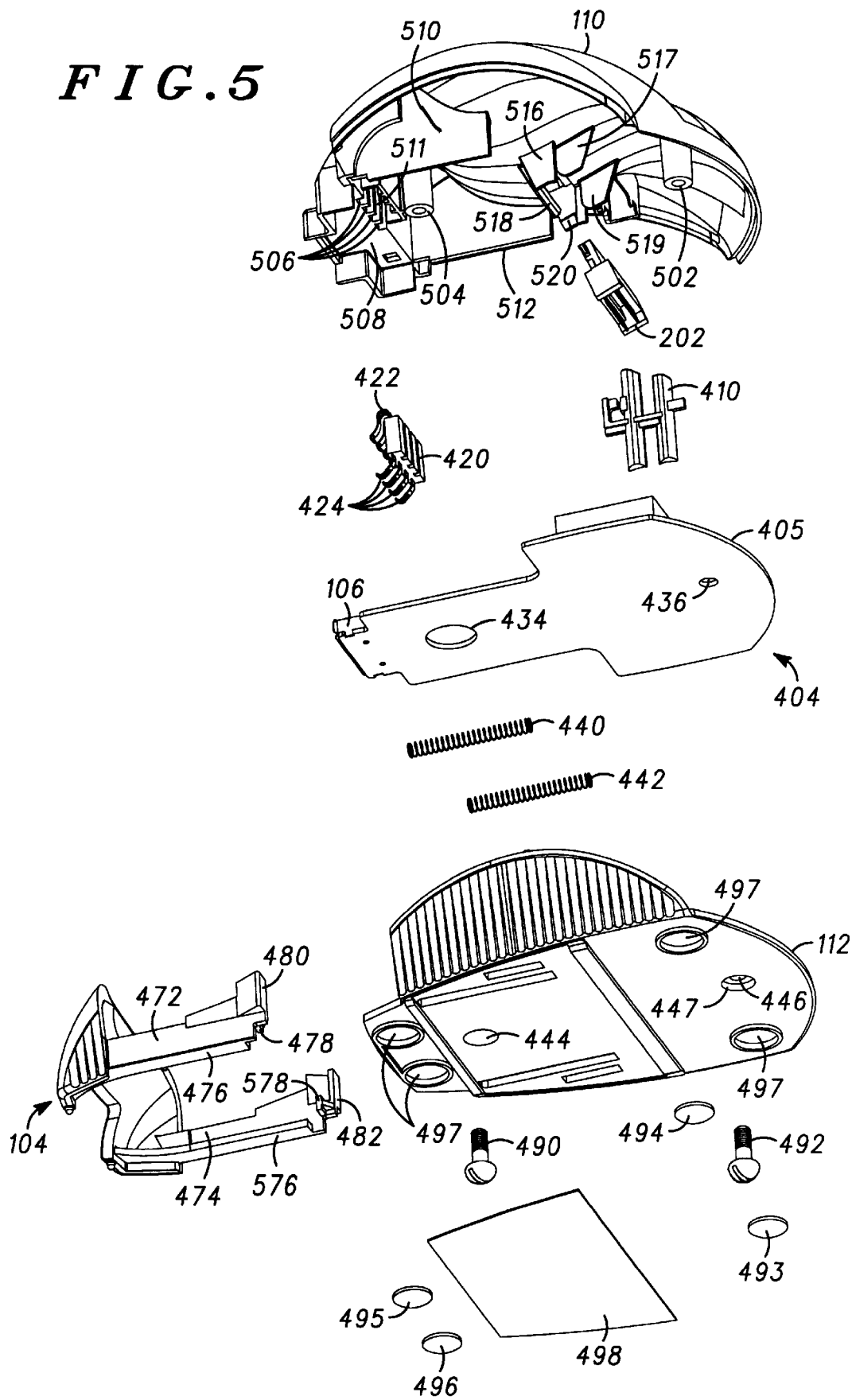
FIG. 5 is an exploded left side, bottom perspective view illustrating the battery charger according to FIG. 1.
Figure 13:
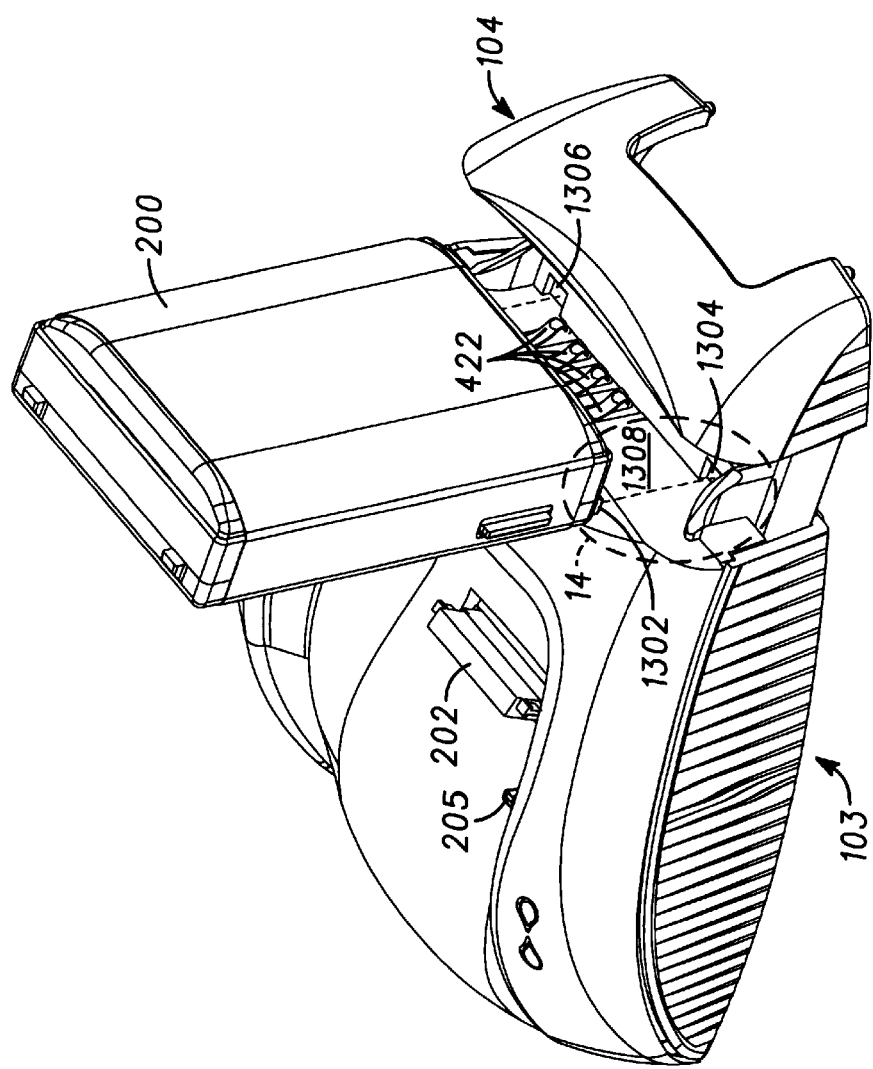
FIG. 13 is top plan view of a battery and charger according to FIG. 3.

With reference to FIG. 5, additional elements of the battery charger housing are visible. The upper housing section 110 includes fins, or spring retainers, 510 and 512 which are aligned with the spring wells 601 and 603 (FIG. 6) to hold the springs in the well after the charger is assembled. The upper housing section 110 also includes a compartment 511 for receiving and holding the contact block 420. The compartment 511 includes openings 506 in a back wall 1308 (FIG. 13) for passage of contacts 422. An opening 508 (FIG. 5) is provided for connector 106.

In the front of the top housing section around aperture 408 (FIG. 5), the top housing section 110 includes snap connectors 516, 518 and 520 that hold the connector 202 in position against fins 517 and 519.

Figure 4:
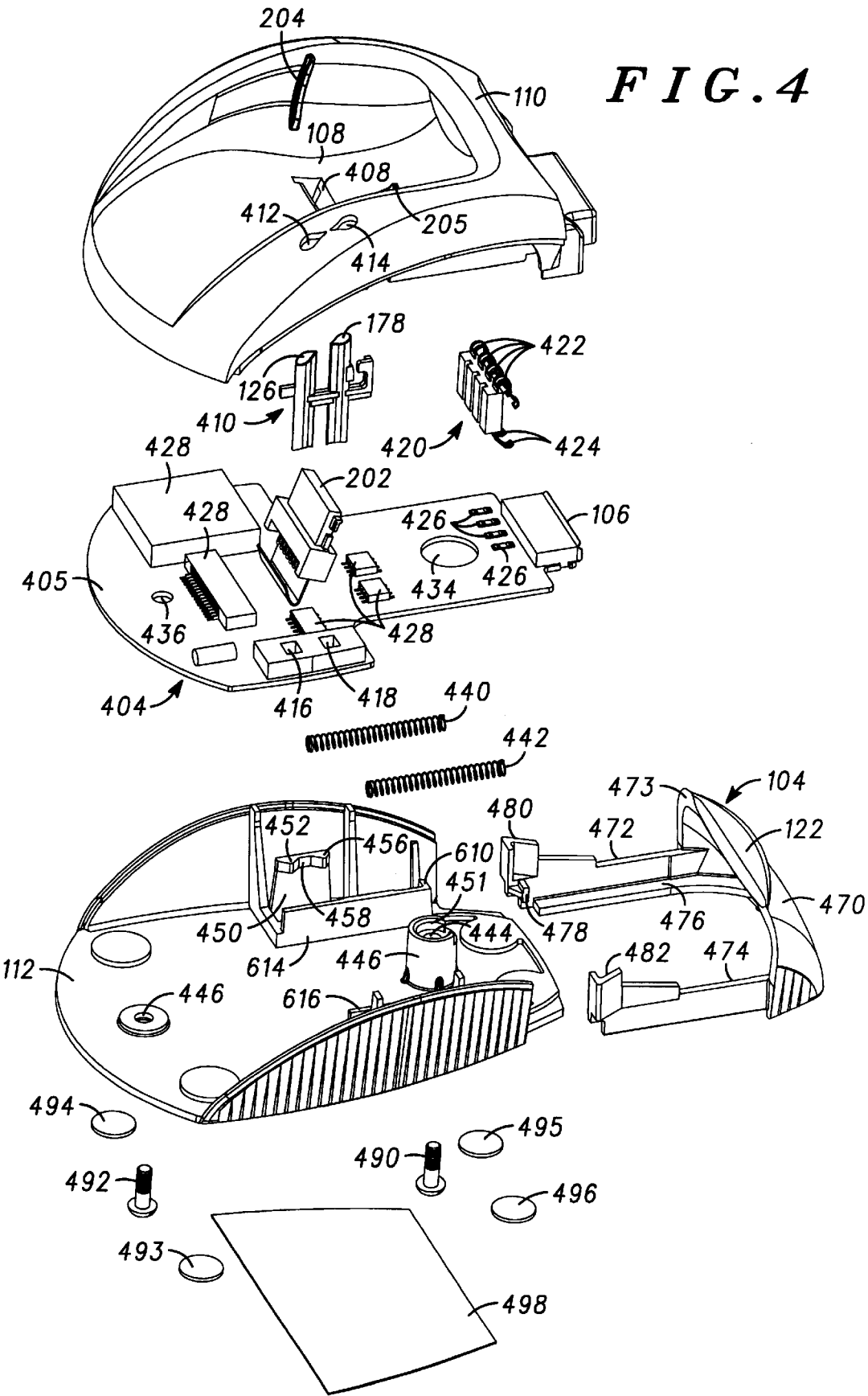
FIG. 4 is an exploded right side, top perspective view illustrating the battery charger according to FIG. 1.

The door housing 104 includes arm beams 472 and 474 extending outwardly from a wall 470 (FIG. 4). Arm beam 472 includes orthogonal base 476 extending from the arm beam side wall. A stop 478 and a finger 480 are positioned on the distal end of arm beam 472. Arm beam 474 similarly includes a finger 482 and a stop 578 (FIG. 5) on a distal end thereof. An orthogonal base 576 extends from the base of the side wall of arm beam 474.

As can be seen in FIG. 5, the door housing 104 is symmetrical, such that each of the arm beams 472 and 474 is a mirror image of the other arm beam. The arm beam 474 includes an orthogonal base 576 and a stop 578. The orthogonal bases 476 and 576 provide shelves on which a battery, inserted in the pocket between front housing 104 and main housing 103, will sit. The orthogonal bases 476 and 576 need not be at right angles to the side walls of arms 472 and 474, but are at such an angle in the illustrated embodiment.

Figure 6:
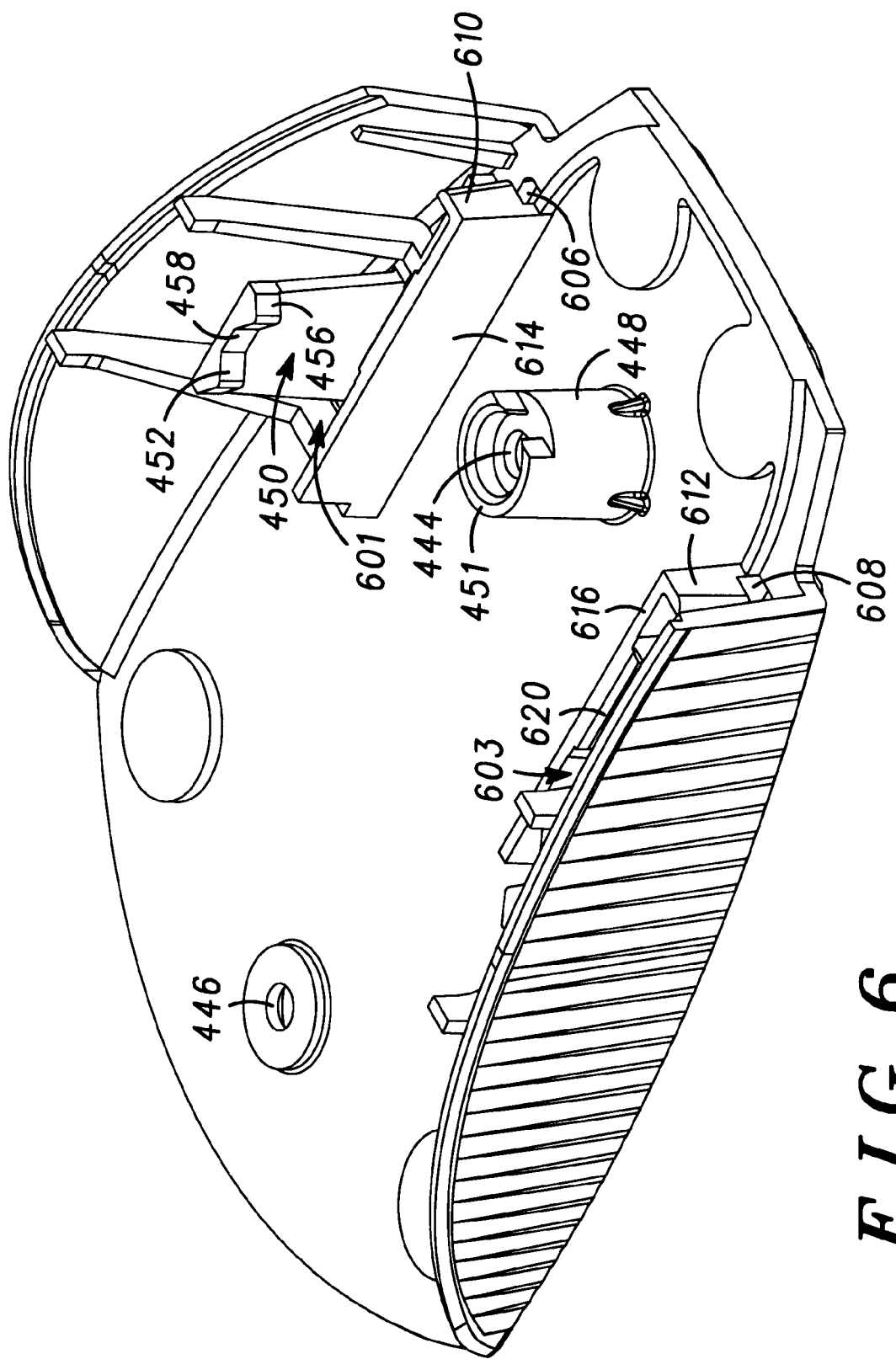
FIG. 6 is a top perspective view illustrating a bottom housing section of the battery charger according to FIG. 1.

With reference to FIG. 6, the bottom housing section 112 includes a spring well 601 and a spring well 603. The spring well 602 includes a side wall 614 and an end wall 610. A channel 606 is provided between the bottom of end wall 610 and the top surface of bottom housing section 112 for receipt of the orthogonal base 478 of arm beam 474. A retainer rib 618 is formed on the top of side wall 614 and is used to hold the spring 416 within the spring well 602. The spring well 603 similarly includes side wall 616 and an end wall 612. A channel 608 is provided between the bottom of end wall 612 and the top surface of bottom housing section 112 for receipt of the orthogonal base 576 of arm beam 472. A retainer rib 620 is provided at the top of side wall 616 to hold the spring in the spring well during assembly.

To assemble the battery charger 103, the feet 493 through 496 are attached to the bottom surface of the bottom housing section 112. The feet are secured in respective recesses 497 (FIG. 5) using a suitable adhesive.

Figure 7:
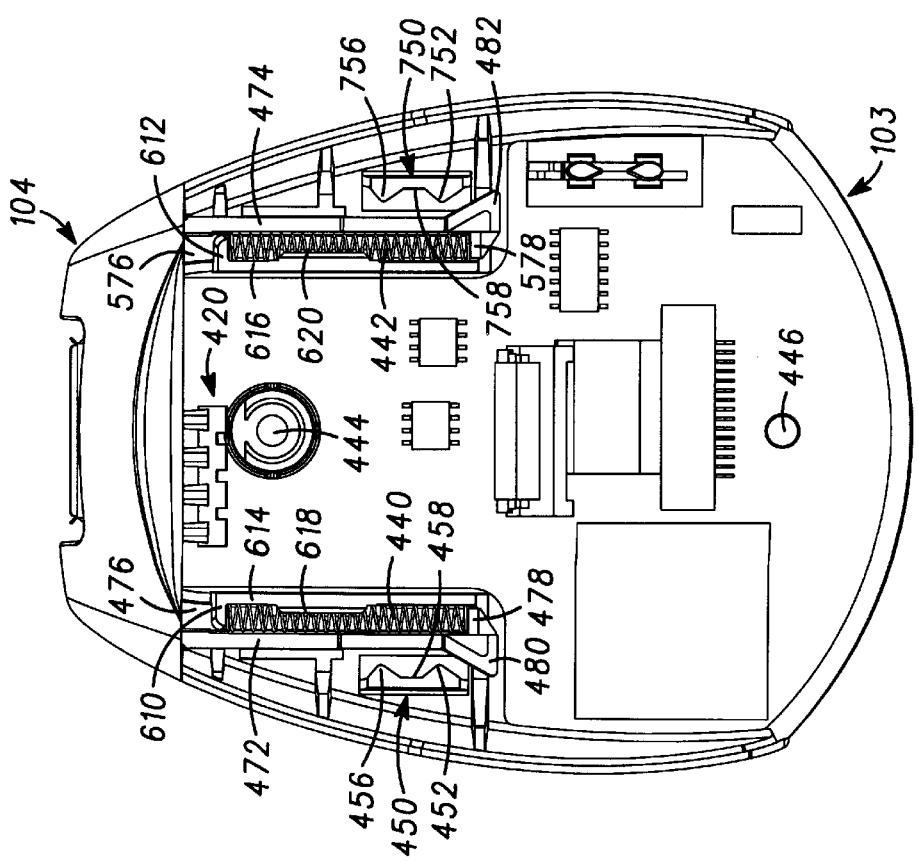
FIG. 7 is a top plan view illustrating a battery charger base and circuit board with the top housing section removed and in a closed position.
Figure 10:
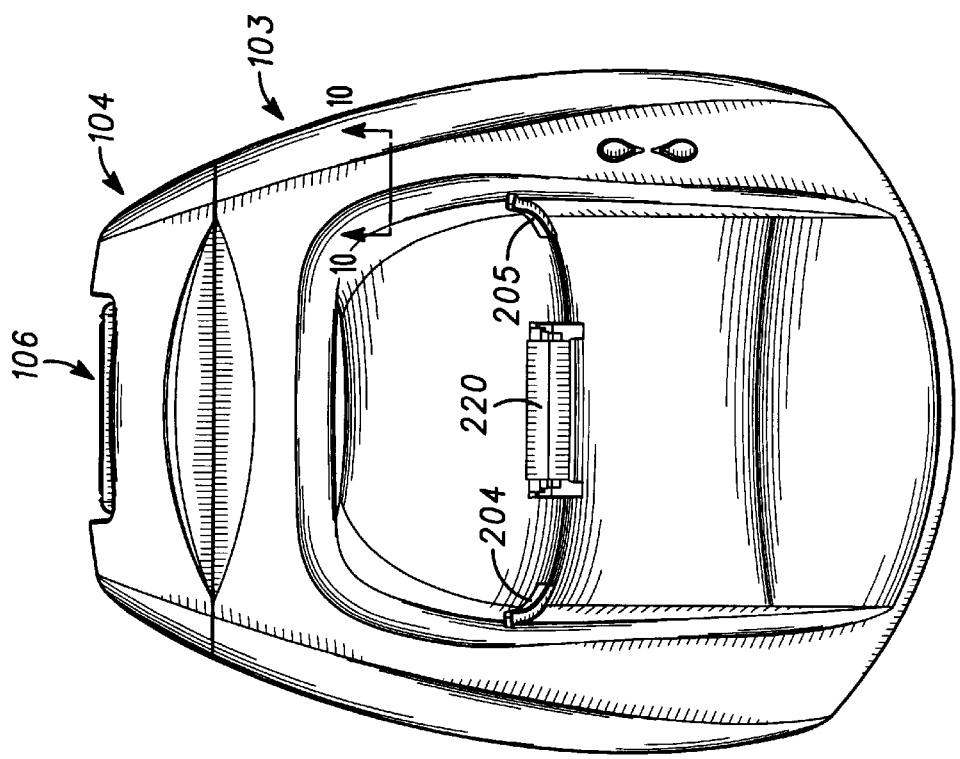
FIG. 10 is a top plan view illustrating the fully assembled battery charger in a closed position.

To assemble the door housing 104 to the main housing 103, the stop 478 and finger 480 of arm beam 472 are dropped into spring well 601 behind end wall 610. Similarly, the stop 578 and finger 480 of arm beam 474 are dropped into spring well 603 behind end wall and 612. The end wall 610 will pass between the stop 478 and the end of orthogonal base 476 of arm beam 472. The orthogonal base 476 and the orthogonal base 576 are then slid through channel 606 and 608, respectively, under the end walls until the door housing edge 473 of wall 470 abuts with bottom housing section 112. This position is generally shown in FIG. 7, and is the closed position for travel and storage.

Spring 442 and spring 440 are then dropped into the spring well such that they extend between the stops 478 and 578 and the end walls 610 and 612, respectively. The retainer ribs 618 and 620 hold the springs in position during the remainder of assembly. The printed circuit board assembly 405 is then positioned in the housing by inserting cylinder well 448 through large PC aperture 434 and positioning small PCB aperture 436 in alignment with base aperture 446. The light pipe 410 is inserted into recesses 416 and 418 and the contact block is positioned in a contact block well 507 in the upper housing section 110. The connector 202 is held in aperture 408 by side snap 516, side snap connector 520 and rear snap connector 518. Fins 517 and 519 also hold the connector 202 in a fixed position within aperture 408.

The top housing section is then positioned in alignment with the lower housing section such that the rear internally threaded cylinder 504 is positioned inside of wall 450 on the end of cylindrical wall 448 and rear internally threaded cylinder 504 is aligned with small aperture 436 and base aperture 446. Screw 490 is then screwed into internally threaded cylinder 502 and screw 492 is screwed into rear internally threaded cylinder 504 to hold the upper housing section 110 firmly in place with bottom housing section 112. The label 497 is then attached to bottom housing section 112 to cover opening 448.

Figure 11:
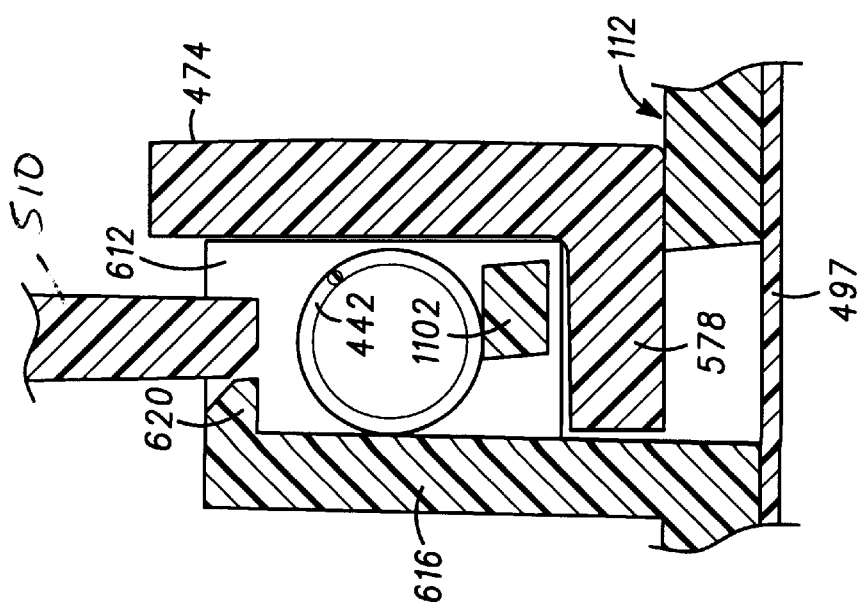
FIG. 11 is a cross-sectional view illustrating a portion of the battery charger taken along plain line 10—10 in FIG. 10.

With reference to FIG. 11, a cross section of the spring well 603 with the spring 442 inserted is illustrated. When the spring 440 is inserted into the well with the housing fully assembled, the spring is held against lateral movement by the side wall of the well recess, a beam 1102, the arm of the front housing and the spring retainer in the upper housing section. This insures that the spring when compressed must compress along its longitudinal axis with a minimal amount of lateral movement permitted.

Figure 12:
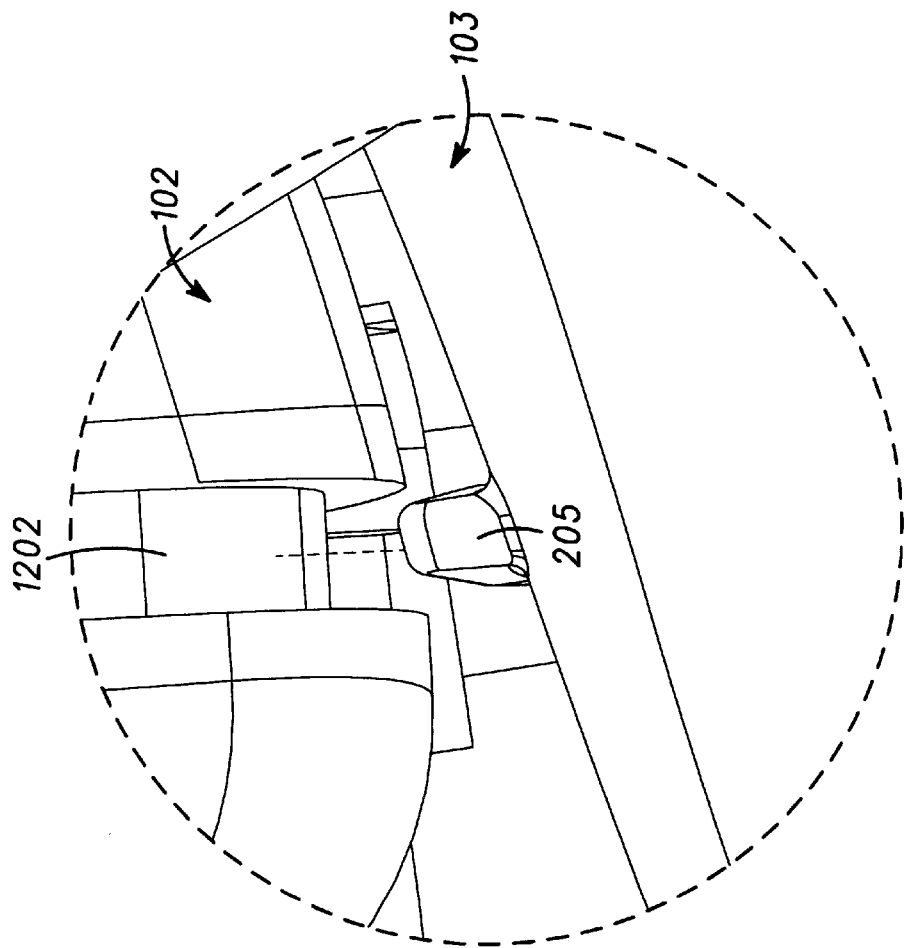
FIG. 12 is a partial enlarged view illustrating the charger and communication device according to FIG. 1.

In operation, the user connects the communication device 102 (FIG. 1) to charger 100 by sliding the device guides 204, 205 into respective channels on the end of the communication device. One of the channels, 1202, is shown in FIGS. 1 and 12 and receives channel guide 205. Another channel (not shown) on the opposite side of the communication device receives channel guide 204. When inserted into the well 108 in this manner, a plug (not shown) on the communication device 102 is interconnected with connector 202 in the battery charger. The battery charger can then provide a DC voltage from the power supplied to the charger 103 through connector 106.

A battery can be inserted between the door housing 104 and the main housing 103 by sliding the door housing 104 to a first position shown in FIG. 2 or a second position shown in FIG. 3, depending on the thickness of the battery.

Figure 8:
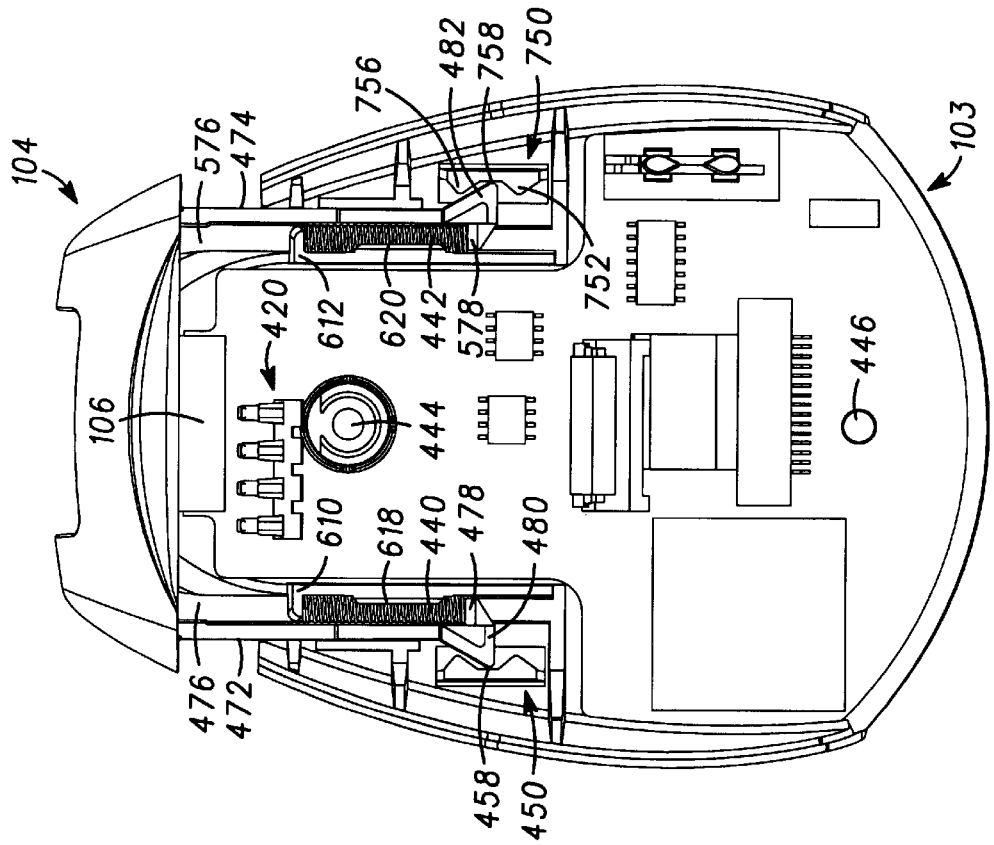
FIG. 8 is a top plan view illustrating a battery charger base and circuit board with the top housing section removed and in a partially extended position for receipt of a thin battery.

To extend the door housing 104, the finger 480 and finger 482 will press the arm 450 and arm 750 (FIG. 7) outwardly as they slide over projections 452 and 752 on the distal ends of these arms to move into the position illustrated in FIG. 8. In the first indexed position, finger 480 is nestled between projection 452 and 456. Similarly, the finger 482 is nestled between projection 752 and 756. The springs 440 and 442 will exert a force holding the battery between the edge 473 of door housing 104 and back wall 1308 of the main housing 103. The battery contacts 422 and block 420 will connect with contacts 310 on the battery 300.

Figure 9:
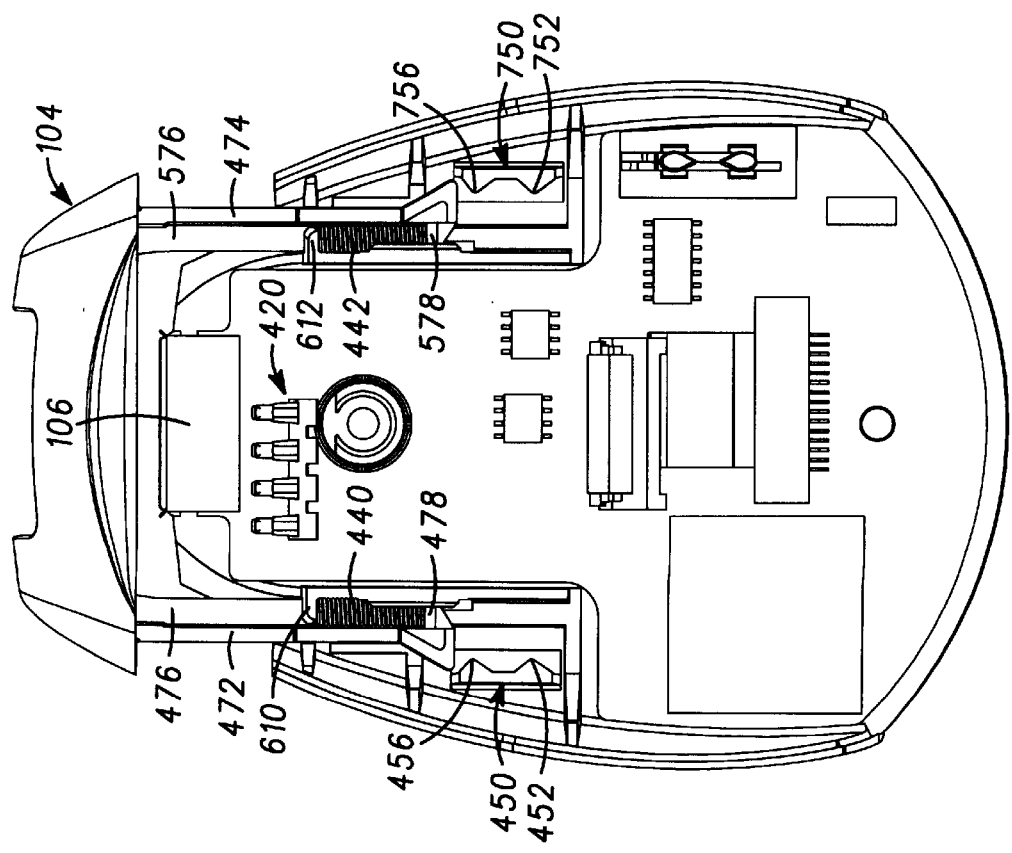
FIG. 9 is a top plan view illustrating the base and circuit board with the top housing section removed and in a fully extended position for receipt of a thick battery.

If a thick battery is inserted, the door housing 104 will move to the second indexed position shown in FIG. 9. To get to this position the finger 480 slides past projection 456 by pushing arm 450 outwardly. Similarly, the finger 482 slides past projection 756 by pushing arm 750 outwardly. The resilient arms 450 and 750 will snap back to the position illustrated in FIG. 9 once the fingers 480 and 482 slide past projections 456 and 756 respectively. The springs 440, 442 will push the door housing 104 against the battery, holding the thick battery firmly in position in the charger 103 with contacts 210 connected to contacts 422 and the battery 300 pressed between the edge 473 of wall 470 and back wall 1308.

The lips 122 on the door housing 104 together with the sloping surface 120 of the main housing section 103 provide a shoe horn to ease insertion of the battery 200, 300 if the user desires to press the battery into the charging position. Alternatively, the user can slide the front door housing out and insert the battery. Upon removal of the battery 200, 300, the springs 440, 442 will push the door housing shut.

Figure 14:
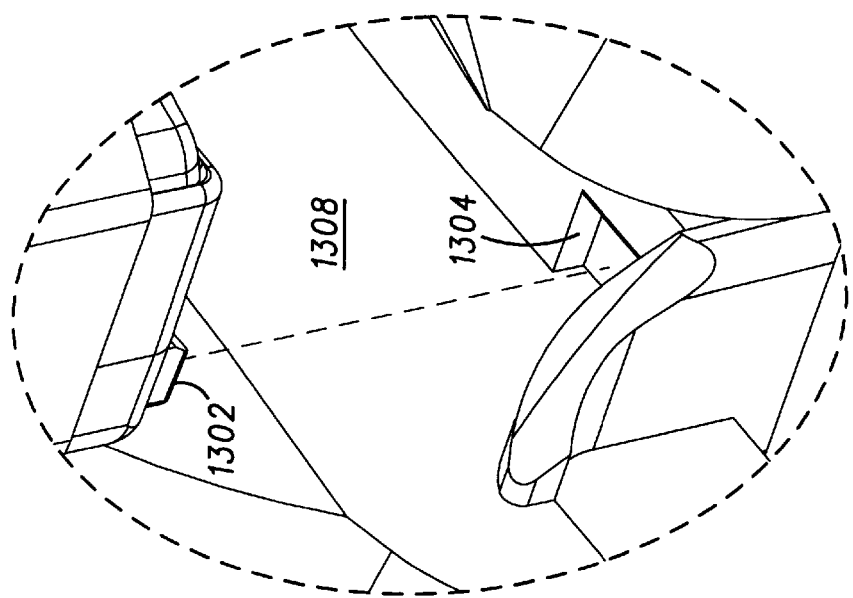
FIG. 14 is a partial enlarged view illustrating the battery and charger according to FIG. 13.

It is envisioned that batteries 200 and 300 can include projections 1302 (FIG. 13) for receipt in recesses 1304 in the battery charger. Thus, when the battery 200 or 300 is inserted into the charger, the projections 1302 will be inserted into recesses 1304 and 1306 as shown in FIG. 14 to prevent the battery from moving away from the battery contacts. This insures that the battery will be held in a reliable electrical connection within the charger.

Figure 15:
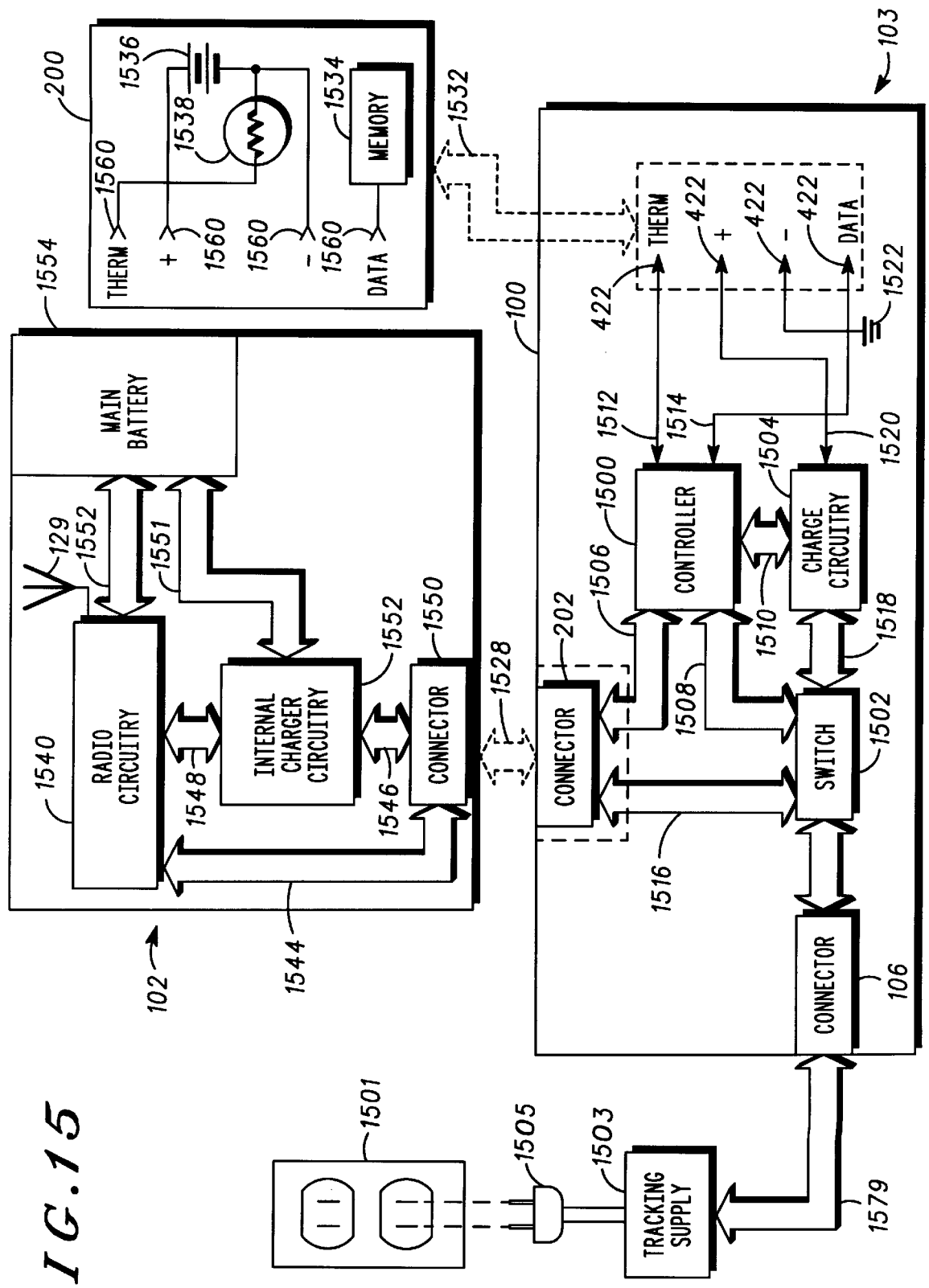
FIG. 15 is a circuit schematic in block diagram form illustrating the charger, communication device and battery

The electrical circuits of battery charger 100, communication device 102, and a battery 200 are illustrated in FIG. 15. Battery charger 100 includes controller 1500, switch 1502, and charge circuitry 1504. Battery charger 100 is connected via cable 1579 to tracking supply 1503. Tracking supply 1503 is connected to wall plug 1505. Wall plug 1505 is connected to a conventional wall outlet 1501 of a main power supply (e.g., 110 Volt AC power supply in the U.S.). Tracking supply 1503 transforms AC power input by wall plug 1505 into DC power and then outputs DC power supplied to battery charger 100 via cable 1579. Tracking supply 1503 adjusts output DC power according to feedback received from charge circuitry 1504 of battery charger 100, or feedback received from electronic device 102 via cable 1579. Tracking supply 1503 is coupled to switch 1502 via cable 1579.

Controller 1500 controls the charging operation of battery charger 100. Controller 1500 is coupled to connector 202 via bus 1506 to communicate with electronic device 102. Controller 1500 inputs control signals to switch 1502 via bus 1508. Controller 1500 controls switch 1502 to connect tracking supply 1503 to either connector 202, via bus 1516 when electronic device 102 is attached, or to charge circuitry 1504, via bus 1518 when thick battery 200 or thin battery 300 is attached.

Controller 1500 is connected to thermistor contacts 422 via wire 1512 to sense the presence of thick battery 202 or thin battery 300. Controller 1500 is connected to data contacts 422 via wire 1514 to read battery data from thick battery 200 or thin battery 300. Controller 1500 is coupled to charge circuitry 1504 via bus 1510. Controller 1500 controls charge circuitry 1504 to deliver charging current to positive contact 422 via wire 1520 according to a predetermined charging algorithm stored in controller 1500. Those skilled in the art will recognize that charge circuitry 1504 includes a current source and a switched power converter, such as a pulse width modulator (PWM), that generates an output current at a level determined by a switch (not shown) controlled by controller 1500. Controller 1500 controls the switch as a function of default data read from a local memory (not shown) or battery data read from thick battery 200 or thin battery 104.

The thick battery 200 includes memory 1534, electrochemical cells 1536, and thermistor 1538. Electrochemical cells 1536, which are coupled in series, include a positive polarity terminal and a negative polarity terminal. The positive polarity terminal is coupled to positive contact 1560. The negative polarity terminal is coupled to negative contact 1560. Electrochemical cells 1536 are preferably rechargeable, and can be any one of the following types: Nickel-Cadmium (NiCd), Nickel-Metal Hydride (NiMH), Alkaline, or Lithium Ion. Memory 1534, which is coupled to data contact 1560, characterizes the large battery 200 as a "smart battery" because the memory 1534 stores data that may be used to optimize charging. Such data includes battery type data, discharge/charge hysteresis data, and history data. Thermistor 1538 is coupled between the negative polarity terminal of electrochemical cells 1536 and thermistor contact 1560. A voltage level across thermistor 1538 indicates the temperature of electrochemical cells 1536. Thin battery 300 includes the same circuitry as thick battery 200, but fewer or smaller electrochemical cells.

Insertion of the thick battery 200 or thin battery 300 in the pocket between door housing 104 and main housing 103 initiates charging. Controller 1500, responsive to a voltage level on wire 1512, reads the battery data on wire 1514, connected to memory 1534. Controller 1500 configures charge circuitry 1504 via bus 1510 according to the battery data received from the memory. Controller 1500 also inputs a control signal to switch 1502 via bus 1508 that controls switch 1502 to connect tracking supply 1503 to charge circuitry 1504. Tracking supply 1503 delivers power to charge circuitry 1504 via cable 1579 and bus 1518.

Electronic device 102 includes connector 1550, radio circuitry 1540 coupled to antenna 129, internal charger circuitry 1542, and battery 1554. Radio circuitry 1540, which preferably includes a microprocessor (not shown), communicates with battery charger 100 via bus 1544 when inserted in front well 108 and attached to connector 202 of battery charger 100. Responsive to this communication and the presence of tracking supply 1503 at connector 202 (also sensed via bus 1544), radio circuitry 1540 senses the presence of batteries 1554, which may be a thick battery 200 or a thin battery 300 attached to the communication device, via bus 1552. Radio circuitry 1540 then reads battery data from either the battery 1554 via bus 1552. Radio circuitry 1540, which includes a controller (not shown), controls internal charger circuitry 1542 via bus 1548 to deliver charging current to battery 1554 via bus 1551.

It will be recognized that the internal charger circuitry 1542 includes a controlled current source, such as a PWM. Under control of radio circuitry 1540, internal charger circuitry 1542 generates a charging current on bus 1551 according to a predetermined charging algorithm and either default data or previously read battery data. Internal charger circuitry 1542 is powered by tracking supply 1503 via connector 1502 and bus 1546.

The communication device 102 can include control circuitry to control the charging current provided to the battery or the communication device 102 can provide a circuit through which the charging current is provided from battery charger 112 to the battery within the communication device.

Thus it can be seen that a charger is disclosed having a compact esthetically pleasing shape when the charger is collapsed in a storage position. Additionally, the charging contacts (battery contacts), are hidden from view by the door housing wall 407 (FIG. 4) in the closed position. The detenting action of at the two indexed extended positions is controlled by the material characteristics of the door arms 472, 474 and the base material of spring arms 450, 750, in particular the resiliency of these materials. Additionally, the lead angle on the projections 452, 456, 752, 756 and the fingers 480, 482 will contribute to the force required to move the door housing 104 in and out. Thirdly, the force of the compression springs 440, 442 in each of the positions of the door housing 104 will contribute to the force required to move the door housing 104.

By using sloped surfaces, an easily collapsible housing is provided with a tactile indexing. The detents 458, 758 (FIGS. 7, 8) provide a positive stop position for the thin battery. The other factors discussed in the previous paragraph insure that the movement will provide the user with desirable movement and indexing characteristics. Accordingly, it will not be too hard for the user to pull the door housing out or return it to the storage position.

Additionally, by using compression spring 440, 442 instead of a tension spring, the life cycle of the battery charger 103 can be significantly increased. The spring trapping ribs 618, 620 hold the loaded compression spring during assembly. The fins 510 and 512 hold the spring in the spring wells 601, 603 when the charger is fully assembled. The snap connectors 516, 518, 520 used to connect the connector 220 on housing section 110 eliminate the need for heat staking which is a more costly operation. Additionally, these snap connector facilitate ease of assembly.

What is claimed is:

1. A battery charger comprising:

a main housing;

a well in said main housing for receipt of an electronic device including a battery;

a door housing slidably carried on said main housing, said door housing including arm beams sliding in said main housing, said door housing movable between open positions for receipt of a battery and a compact closed position, sid door housing sliding to different open positions to create different sized pockets to receive different sized batteries;

at least one contact carried on said main housing for connection to a battery inserted between said door housing and said main housing; and a circuit positioned in said main housing, said circuit coupled to said at least one contact for charging a battery and said circuit for electrical connection to the electronic device for providing power to the electronic device.

2. The battery charger as defined in claim 1, wherein said door housing includes a lip positioned on said door housing and said main housing includes an angled surface, wherein said angled surface and said lip are sloped to ease insertion of a battery when said door housing is in a closed position.

3. The battery charger as defined in claim 1, further including at least one recess for receipt of at least one projection on a battery inserted into the battery charger.

4. The battery charger as defined in claim 3, wherein said at least one recess is spaced from said at least one contact.

5. The battery charger as defined in claim 4, wherein said at least one contact extends through an aperture in one surface and said at least one recess is in another surface.

6. The battery charger as defined in claim 1, wherein said main housing includes a spring arm positioned in a spring well, said finger sliding in said spring well when the door housing moves on said main housing.

7. The battery charger as defined in claim 6, further including a coil spring positioned in said spring well, said coil spring biasing said door housing into the closed position to position a battery received in the charger.

8. A battery charger comprising:

a main housing;

a well in said main housing for receipt of an electronic device including a battery;

a door housing movably carried on said main housing, wherein said door housing includes a door housing wall and at least one arm beam extending outwardly from said door housing wall, said at least one arm beam for insertion into the main housing, said at least one arm beam including a base on which a battery can sit when inserted between said door housing wall and said main housing;

at least one contact carried on said main housing for connection to a battery inserted between said door housing and said main housing, wherein said door housing is movable between an open position for receipt of a battery and a compact closed position; and a circuit positioned in said main housing for electrical connection to the electronic device and said contacts for charging at least one battery.

9. The battery charger as defined in claim 8, further including a finger on the end of said at least one arm beam to engage a spring arm on said main housing to provide a first position index in a first position for a thin battery and a second position index in a second position for a thick battery.

10. The battery charger as defined in claim 9, further including a spring well in said main housing for receipt of a spring, said spring positioned between said at least one arm of said door housing and a wall in said main housing such that said spring biases said door housing into a closed position.

11. The battery charger as defined in claim 9, wherein each of said at least one arm beams includes a base and a side wall, said base and said side wall of each at least one arm beam sliding into a respective channel in said main housing.

12. The battery charger as defined in claim 11, wherein at least one of said at least one arm beams includes a finger which engages said main housing at a plurality of index positions.

13. The battery charger as defined in claim 12, wherein said main housing includes a spring arm having projections providing said index positions.

14. The battery charger as defined in claim 9, wherein said spring arm is positioned in a spring well, said finger sliding in said spring well when the door housing moves on said main housing.

15. The battery charger as defined in claim 14, further including a coil spring positioned in said spring well, said coil spring biasing said door housing into the closed position to position a battery received in the charger.

16. The battery charger as defined in claim 8, wherein said at least one arm beam includes two arm beams, each of the two arm beam including a base on which a battery can sit when inserted between said door housing wall and said main housing.

17. The battery charger as defined in claim 16, wherein each of said two arm beams includes a finger which engages said main housing at a plurality of index positions.

18. The battery charger as defined in claim 17, wherein said main housing includes a respective spring arm associated with each of said fingers, each of said spring arms having projections providing said index positions.

19. A battery charger for a communication device, comprising:

a main housing;

a well in said main housing for receipt of a communication device having a chargeable battery;

a connector in said well for electrical connection to the communication device;

a door housing including a plurality of arms for moving connection to said main housing, said door housing for providing a variable sized battery pocket remote from said well;

a plurality of contacts positioned in a wail of said main housing for connection to contacts of a battery inserted in said variable sized battery pocket; and a circuit in said main housing, said circuit for connection to an external power supply and providing energizing power to the communication device and said contacts, energizing power for charging the communication device battery when the communication device is received in said well and a battery connected to said contacts when positioned between said door housing and said main housing.

20. The battery charger as defined in claim 19, wherein at least two of said arm beams include a base for supporting a battery during charging.

* * * * *